(12) United States Patent
Zhou et al.

(10) Patent No.: US 11,416,344 B2
(45) Date of Patent: Aug. 16, 2022

(54) PARTIAL DATABASE RESTORATION

(71) Applicant: Rubrik, Inc., Palo Alto, CA (US)

(72) Inventors: Pin Zhou, San Jose, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 16/151,263

(22) Filed: Oct. 3, 2018

(65) Prior Publication Data
US 2019/0102257 A1 Apr. 4, 2019

Related U.S. Application Data

(60) Provisional application No. 62/567,499, filed on Oct. 3, 2017.

(51) Int. Cl.
*G06F 11/14* (2006.01)
*G06F 16/21* (2019.01)

(52) U.S. Cl.
CPC ...... *G06F 11/1451* (2013.01); *G06F 11/1461* (2013.01); *G06F 11/1469* (2013.01); *G06F 16/219* (2019.01)

(58) Field of Classification Search
CPC ............... G06F 16/219; G06F 11/1461; G06F 11/1451; G06F 11/1469
See application file for complete search history.

(56) References Cited

U.S. PATENT DOCUMENTS

| 6,324,548 B1 | 11/2001 | Sorenson |
| 7,620,785 B1 | 11/2009 | Coulter et al. |
| 8,478,726 B2 | 7/2013 | Habermann et al. |
| 9,558,072 B1 | 1/2017 | Mam |
| 9,563,655 B2 | 2/2017 | Chen et al. |
| 10,049,020 B2 | 8/2018 | French et al. |
| 10,713,124 B2 | 7/2020 | Luo et al. |
| 11,216,344 B2 | 1/2022 | Kochar et al. |
| 2005/0120064 A1* | 6/2005 | Sinha .................... G06F 16/219 |

(Continued)

FOREIGN PATENT DOCUMENTS

WO 2019070915 4/2019

OTHER PUBLICATIONS

"International Application Serial No. PCT US2018 054256, International Search Report dated Dec. 4, 2018", 3 pgs.

(Continued)

*Primary Examiner* — Jay A Morrison
(74) *Attorney, Agent, or Firm* — Holland & Hart LLP (57) ABSTRACT

Described herein is a system that restores a database by processing a portion of the database. The system restores the database to a previous state at a particular time by reverting data entries that have changed since the time to their initial values before the change. Data entries that have changed after the restore time are identified. For the data entries that have changed after the restore time, their initial values before the change are determined from various sources. The system determines a database version that is created most recently before the restore time. The system additionally identifies changes to the database between the restore time and when the database version is created. The initial values can be determined from either the database version or the changes made to the database between the restore time and when the database version is created.

19 Claims, 5 Drawing Sheets

(56) References Cited

U.S. PATENT DOCUMENTS

| | | | |
|---|---|---|---|
| 2007/0185922 A1 | 8/2007 | Kapoor et al. | |
| 2008/0270838 A1 | 10/2008 | Dorai et al. | |
| 2011/0161295 A1* | 6/2011 | Ngo | G06F 11/1446 707/639 |
| 2011/0258164 A1* | 10/2011 | Mandagere | G06F 11/1435 707/685 |
| 2015/0261623 A1 | 9/2015 | Ho et al. | |
| 2016/0110268 A1 | 4/2016 | Sekiguchi et al. | |
| 2016/0117228 A1* | 4/2016 | Farlee | G06F 11/1471 714/19 |
| 2016/0306709 A1 | 10/2016 | Shaull | |
| 2017/0075764 A1 | 3/2017 | Banister | |
| 2017/0230177 A1 | 8/2017 | Barbas et al. | |
| 2018/0137016 A1 | 5/2018 | Brown et al. | |
| 2018/0373604 A1* | 12/2018 | Martin | G06F 11/1451 |
| 2019/0073372 A1 | 3/2019 | Venkatesan et al. | |
| 2019/0155699 A1 | 5/2019 | Luo et al. | |
| 2021/0117293 A1 | 4/2021 | Luo et al. | |
| 2021/0224166 A1 | 7/2021 | Luo et al. | |
| 2021/0357297 A1 | 11/2021 | Kochar et al. | |
| 2022/0058093 A1 | 2/2022 | Kochar et al. | |

OTHER PUBLICATIONS

"International Application Serial No. PCT US2018 054256, Written Opinion dated Dec. 4, 2018", 4 pgs.

"U.S. Appl. No. 15/819,373, Non Final Office Action dated Nov. 27, 2019", 27 pages.

"U.S. Appl. No. 15/819,373, Response filed Feb. 19, 2020 to Non Final Office Action dated Nov. 27, 2019", 14 pages.

Osuna, A, "Introduction to SnapManager for Virtual Infrastructure", SnapManager 2.0 for Virtual Infrastructure Best Practices, (2010), 6 pages.

U.S. Appl. No. 16/890,542, filed Jun. 2, 2020, Database Snapshot and Backup Management With Recoverable Chains.

U.S. Appl. No. 15/931,291, filed May 13, 2020, Real Time Database Backup Status Indication and Restore.

"U.S. Appl. No. 15/819,373, Notice of Allowance dated Mar. 5, 2020", 8 pgs.

"European Application Serial No. 18864993.3, Extended European Search Report dated Oct. 23, 2020", 8 pgs.

Rubrik, "Rubrik Announces Andes 5.0 Release", (Nov. 14, 2018), 7 pages.

Rubrik, "Rubrik Andes 5.0", (Nov. 12, 2018), 2 pages.

Rubrik, "Game-Changing Innovation for Oracle Data Management", (Nov. 12, 2018), 4 pages.

"U.S. Appl. No. 17/143,081, Preliminary Amendment filed Apr. 12, 2021", 9 pgs.

"U.S. Appl. No. 15/931,291, Non Final Office Action dated Apr. 15, 2021", 8 pages.

"U.S. Appl. No. 15/931,291, Response filed Jul. 7, 2021 to Non Final Office Action dated Apr. 15, 2021", 9 pages.

* cited by examiner

PARTIAL DATABASE RESTORATION

CROSS-REFERENCE TO RELATED APPLICATION

This application claims the benefit of U.S. Provisional Application 62/567,499, filed Oct. 3, 2017, of which the subject matter is incorporated herein by reference in its entirety.

TECHNICAL BACKGROUND

Database backups can be created periodically to protect the information stored in the databases. In the event that a database crashes, corrupts, or is lost, the backups can be used to restore the database to an earlier state. For instance, if a database crashes at 4:55 pm, the database can be restored by loading the last backup created at 4 pm. This approach does not restore the database to its latest state before the error. Continue with the previous example, the changes between 4 pm and 4:55 pm are lost. Furthermore, the restoration process is a computing-resource intensive task. Transfer of backups typically consumes a lot of network bandwidth because backups include a large amount of data. In addition, loading a backup into a database consumes a lot of processing resources. During the recovery, the database may not even be accessible, which may lead to reduced productivity for functions that rely on such accesses.

SUMMARY

Described herein is a system that restores a database by processing a portion of the database. The system restores the database to a previous state at a particular time by reverting data entries that have changed since the time to their initial values before the change. As such, the restoration can be achieved by processing the database partially which obviates the need to process the entire database. Compared to conventional ways of restoring databases by loading an entire database backup, the approach described herein is more efficient, and consumes less network bandwidth and computing power. This is because the system does not process those data entries that have not changed since the time.

The system determines a restore time at which the database is to be restored to a previous state determined by the restore time. The restore time can be set to a time point right before when the database crashes, corrupts, or gets lost. These events may be caused by logical errors. Data entries that have changed after the restore time are identified. For the data entries that have changed after the restore time, their initial values before the change are determined from various sources. The system determines a database version that is created most recently before the restore time. The system additionally identifies changes to the database between the restore time and when the database version is created. The initial values can be determined from either the database version or the changes made to the database between the restore time and when the database version is created. The database is restored to the previous state by reverting those data entries to their initial values.

BRIEF DESCRIPTION OF THE DRAWINGS

The invention has other advantages and features, which will be more readily apparent from the following detailed description of the invention and the appended claims, when taken in conjunction with the accompanying drawings, in which:

DETAILED DESCRIPTION

Described herein is a system that restores a database to its previous state by processing a portion of the database, which reduces the amount of time and resources used to restore the database. To do so, the system leverages a database system's ability to track changes in a database. The changes are used to determine which data entries have changed during a time interval. To restore a database back to its previous state at a particular time, only the data entries that changed are rolled back to their previous values, as described in more detail below. This process is much more time and computing resource efficient because the number of changed entries is far fewer than the number of all entries.

Figure 1:
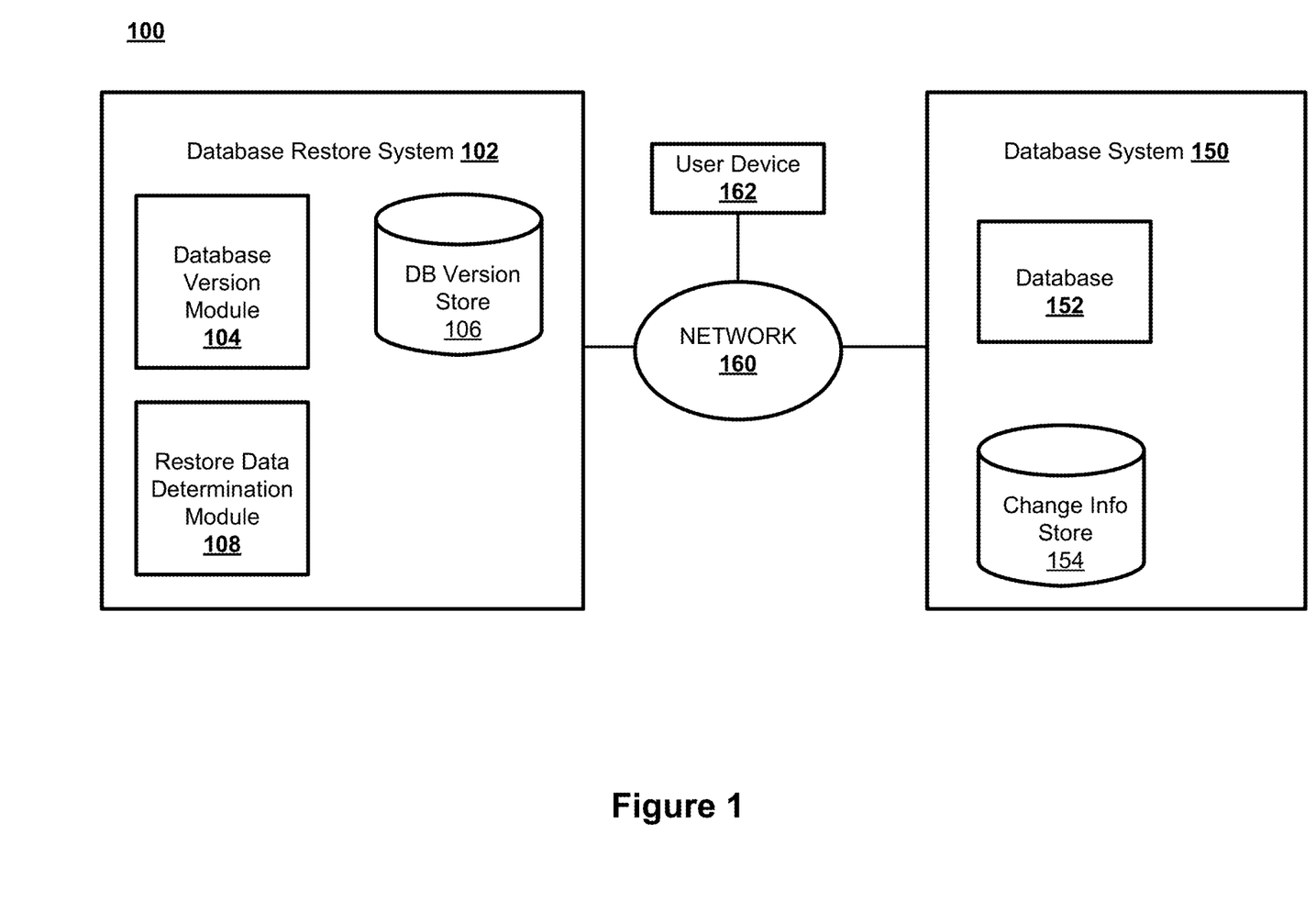
FIG. 1 is a diagram of an example environment in which a database restore system restores a database by processing a portion of the database, according to one embodiment.

FIG. 1 is a diagram of an example environment 100 in which a database restore system restores a database by processing a portion of the database, according to one embodiment. The example environment 100 includes a database restore system 102 and a database system 150. As further described below, the database system 150 hosts databases and the database restore system 102 manages restoration of the databases hosted by the database system 150. The database restore system 120 and the database system 150 are in communication with each other via a network 160. The environment 100 further includes a user device 162 that is in communication with the rest of the environment 100 via the network 160.

The database restore system 102 manages restoration of databases such as those hosted by the database system 150. For a particular database that is to be restored to a previous state, the database restore system 102 determines a portion of the database that has changed from the previous state and reverts the portion back to its previous state. The database restore system 102 includes a database version module 104, a database version store 106, and a restore data determination module 108.

The database version module 104 creates and maintains database versions of databases (e.g., the database 152). A database version captures a state of a database at a particular time. That is, the database version includes a copy of data stored in the database at the particular time point. The data stored in the database includes data entries and associated values. A database version can be a full copy or an incremental copy of the data stored in the database at the particular time point. The full copy includes copies of all data stored in the database at the time point. The incremental copy includes copies of data that has changed since the immediate previous database version was created. The database versions are stored in the database version store 106. For a particular database, the database versions effectively serve as backups of the database. For example, a previous state of the database can be restored by using a full copy of the database. As another example, a previous state of the database can be restored by using an incremental copy and the full copy of the database referenced by the incremental copy.

The restore data determination module 108 determines the portion of the database that has changed and a previous state to which this portion is to be restored. To determine the portion of the database that has changed, the restore data determination module 108 determines which entries have changed from the previous state. The previous state can be determined by a time. This time is also referred hereinafter as the "restore time." The database is restored from a later state to the previous state. This later state is a state of the database at a later time after the restore time. In some embodiments, this later state is the current state of the database at the current time.

In some embodiments, the restore data determination module 108 determines the data entries that changed from the restore time to the later time based on change information. The change information describes changes made to the database in a time window. The changes made to the data entries include adding a data entry, deleting a data entry, modifying a data entry, or other changes. In some embodiments, the change information describes a particular data entry that changed and the value of the data entry after the change. The change information also includes a timestamp associated with each change. The restore data determination module 108 uses the restore time and the later time to find the data entries that changed from the previous state to the later state. The data entries that changed during the time interval from the restore time through the later time are associated with timestamps within the time interval. If the later time is the current time, the restore data determination module 108 uses the restore time to find the data entries that have changed from the previous state, for example, by comparing the timestamps associated with the changes to the restore time. Data entries that changed before the later time can be found in a similar fashion. The change information is created by the database system 150 as further described below.

The restore data determination module 108 obtains the change information from the database system 150. In some embodiments, if a database is to be restored, the restore data determination module 108 obtains the change information from the database system 150. In some embodiments, the restore data determination module 108 obtains the change information periodically from the database system 150. The restore data determination module 108 may obtain the change information describing changes in a particular time interval. In some embodiments, the restore data determination module 108 receives change information from the database system 150 if a change is made to the database. The provision of information can be configured in either a push or pull arrangement between the restore data determination module 108 and database system 150.

The restore data determination module 108 determines the previous state to which the portion is to be restored by determining initial values of the data entries that changed from the previous state. That is, for each data entry that changed from the restore time, the restore data determination module 108 determines a value of the data entry before the change. This value is also referred to herein as the "previous value" or "initial value." The restore data determination module 108 determines one or more data sources from where the previous values can be obtained. A data source can be a database version or change information.

The restore data determination module 108 identifies a database version as one data source based on the restore time. For a particular database, the database version is the latest database version that is created most recently before the restore time among all database versions created. This database version is also referred to herein as "a restore database version." The restore database version is not necessarily the latest database version that is created by the database version module 104 for the database. The restore database version can be identified from database versions stored in the database version store 106. For example, the restore data determination module 108 compares the restore time to time stamps associated with the database versions stored in the database version store 106 to find the restore database version.

The restore data determination module 108 further identifies any portion of the database that changed from the restore database version creation time to the restore time. For example, any data entry that changed from the restore database version creation time to the restore time is identified. The restore data determination 108 may identify such data entry by determining change information that describes changes made to the database from the restore database version creation time to the restore time. The determination is similar to the determination of data entries that changed from the restore time to the later time as described above.

For a data entry that changed from the restore time, the restore data determination module 108 determines its previous value from one of the one or more identified data sources. The restore data determination module 108 examines the one or more identified data sources in a reverse chronological order. That is, for a particular data entry, the restore data determination module 108 determines whether the data entry matches any data entry that changed from the restore database version creation time to the restore time. If there is a match, the restore data determination module 108 determines that the value included in the change information is the previous value. If there are multiple matches, the restore data determination module 108 determines that the value in the latest change information is the previous value. If there is no match, the restore data determination module 108 determines that the value of the data entry in the restore database version is the previous value. In some embodiments, when examining whether the data entry matches any data entry in the change information, the restore data determination module 108 stops examining the entire change information after identifying a match.

The restore data determination module 108 provides the previous values of the data entries that changed from the restore time to the database system 150. To restore the database to the previous state, the database system 150 reverts those data entries to their previous values. That process effectively restores database 152 to the previous state without having to restore the entire database.

The databases system 150 includes a database 152 and a change information store 154. The database system 150 hosts the database 152. In operation, the database system 150 hosts information in the form of data entries within the database 152. The database 152 can be hosted by a single device or a distributed database that is hosted by multiple devices. The database system 150 may include one or multiple devices across which the database 152 is hosted.

Users and applications may communicate with the database system 150 to access the database 152.

The database system 150 tracks changes made to the database 152. In some embodiments, the database system 150 tracks changes since the creation time of the most recent database version. In some embodiments, the database system 150 tracks changes over time. That is, changes made to the database between database versions are tracked. In various embodiments, the change information is in the form of a change log including change records. A change record is generated to record one change such as a database operation (e.g., insert, delete, update) made to one data entry at a particular time. The change information is stored in the change information store 154.

The user device 162 is a computing device with which users interact. Via the user device 162, a user can access the database system 150 and the database restore system 102. For example, a user can provide the restore time or a logical error via the user device 162. A logical error may impact one or more database entries, for example, by changing the entries to wrong values.

The network 160 facilitates the data information exchange among different components in the environment 100. The network 160 includes network elements such as switches, routers, wireless/wired communication links, etc. Many different types of networks could be used. In some cases, the network 160 uses standard communications technologies and/or protocols and can include the Internet, local area networks, and other types of private or public networks. The components can also be connected using custom and/or dedicated data communications technologies.

Figure 2:
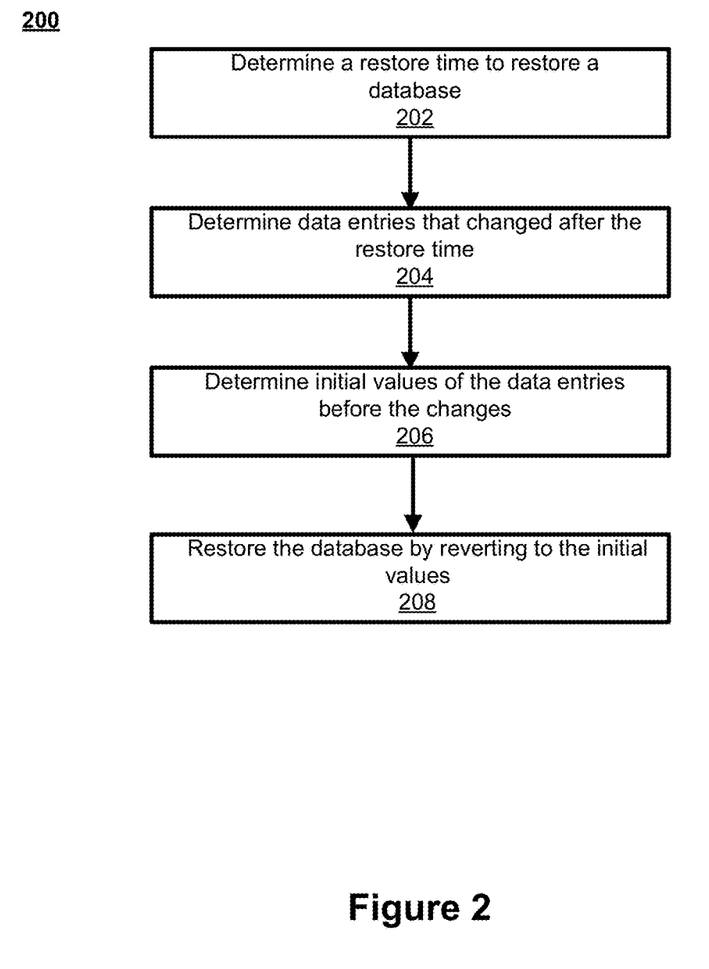
FIG. 2 is a flow chart illustrating an example process of restoring a database by processing a portion of the database, according to one embodiment.

FIG. 2 is a flow chart of an example process 200 of restoring a database by processing a portion of the database, according to one embodiment. Take the environment 100 illustrated in FIG. 1 as an example, the database restore system 102 determines 202 a restore time to restore the database 152. The restore time may be determined in a variety of ways. The database restore system 102 may determine the restore time, for example, according to a timestamp associated with a data entry (e.g., when the data entry was created or modified). As one example, a user identifies a corrupt data entry and the database restore system 102 determines the restore time as the time right before the corruption event. The versioning system 100 may also receive the restore time from another system such as the database system 150 or a user device 162. A restore time may be included in a user instruction.

The database restore system 102 determines 204 data entries that changed after the restore time. Based on the restore time, the database restore system 102 obtains change information that describes changes made to the database after the restore time. For example, the database restore system 102 obtains changes information from the change information store 154 by comparing the restore time to timestamps associated with the changes. As such, the database restore system 102 determines changes made to the database 152 after the restore time. If the database 152 is restored from a later time that is not the current time, the changes are made before the later time. Details of the determination are provided above in connection with the restore data determination module 108.

The database restore system 102 determines 206 initial values of the data entries before the changes. For example, the database restore system 102 determines one or more data sources that include the initial values of the data entries before the changes. A data source can be a restore database version or change information including changes made to the database from the restore database version creation time to the restore time. For each data entry that changed after the restore time, the database restore system 120 determines whether it changed from the restore database version creation time to the restore time. If it did, its initial value is the value included in latest change within the time interval between the restore database version creation time and the restore time. If it did not, its initial value is the value stored in the restore database version. Details of the determination of the initial values are described above in connection with the restore data determination module 108.

The database restore system 102 restores 208 the database to a previous state by reverting the data entries to their initial values. The previous state is the state of the database 152 at the restore time. The database restore system 102 may provide a list of the data entries and their initial values to the database system 150. For each data entries on the list, the database system 150 reverts its value to the initial value. For example, if a data entry is modified after the restore time, the database system 150 reverts its value to the initial value before the restore time. If a data entry is removed after the restore time, the database system 150 inserts it along with its initial value before the removal. If a data entry is added after the restore time, the database system 150 removes it.

Figure 3:
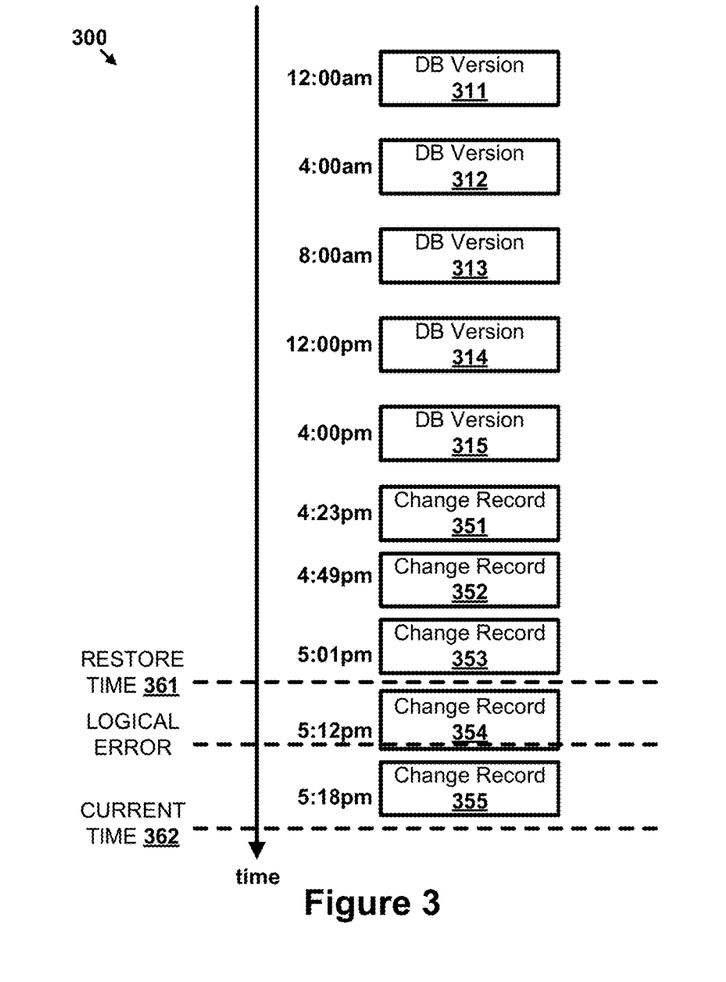
FIG. 3 illustrates a timeline of events in the environment, according to one embodiment.
Figure 4:
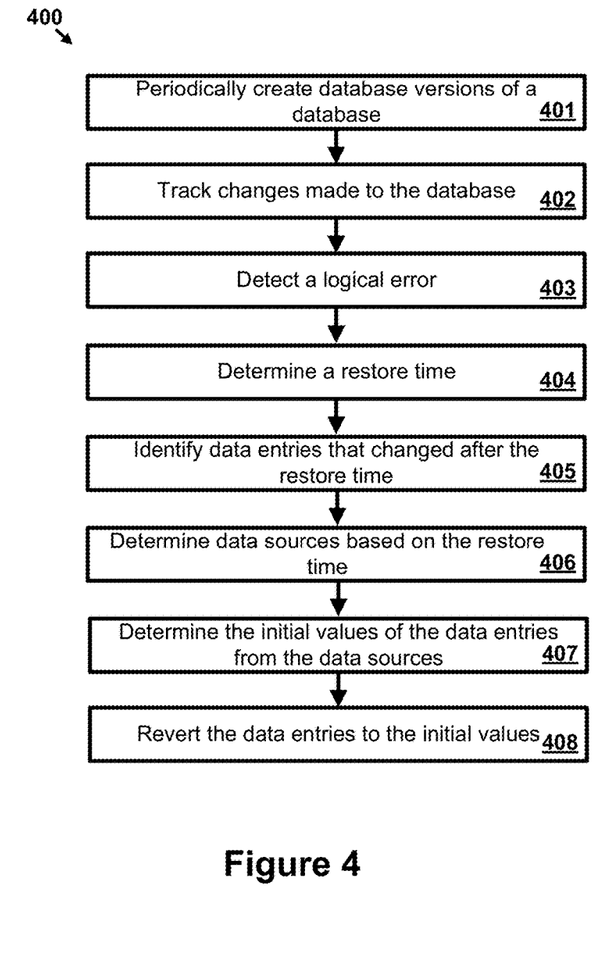
FIG. 4 is a flow chart illustrating an example process of an environment restoring a database to a previous state by processing a portion of the database, according to one embodiment.

FIGS. 3 and 4 are described in connection with each other. FIG. 3 illustrates a timeline 300 of events in the environment 100. FIG. 4 is a flow chart 400 illustrating an example process of the environment 100 restoring a database (e.g., the database 152) to a previous state by processing a portion of the database.

The database restore system 102 periodically creates 401 database versions of the database 152. As illustrated in FIG. 4, the database restore system 102 creates database versions every four hours: the database versions 311-315 are created at 12:00 am, 4:00 am, 8:00 am, 12:00 pm, and 4:00 pm, respectively. The database versions can be used to restore the database 152 to a state corresponding to a time point that is between 12:00 am (when the database version 311 was created) and 4:00 pm (when the database version 315 was created). The database restore system 102 may create other database versions over time. Assuming that the database version 311 is the first version created by the database restore system 102, the database version 311 is a full copy of the database 152. The database versions 312 through 315 are incremental copies of the database 152. It should be understood that, while the period between database versions is four hours in this example, other period lengths may be used.

The database system 150 further tracks changes made to the database. The database system 150 creates and stores change information describing the changes made to the database over time. In some embodiments, the change information is stored in a change log including change records. In the illustrated example, after 4:00 pm when the most recent database version 315 was created, the database system 150 creates change records 351 through 355 that describe changes made to the database after 4:00 pm. The change records 351 through 355 each record a data entry change made to a data entry at 4:23 pm, 4:49 pm, 5:01 pm, 5:12 pm, and 5:18 pm, respectively. Each change record includes information such as a data entry identifier identifying the data entry that changes as well as the value of the data entry after the change. The changes made to the database from 12:00 am to 4:00 pm are not shown in FIG. 3.

The current time 362 is some time after 5:18 pm data entry change which is recorded in the change record 355.

The database 152 is to be restored to a state corresponding to the restore time 361. The restore time 361 is after 5:01 pm data entry change which is recorded in the change record 353 and before 5:12 pm data entry change which is recorded in the change record 354. Details of the obtaining information are provided above and are omitted herein.

The database restore system 102 detects 403 a logical error in the database 152. The logical error began with the 5:12 pm data entry change which is recorded by the data change record 354. The database restore system 102 may receive a report of the logical error from the database system 150. In some embodiments, the logical error may be detected according to a user input. For example, a user identifies a set of change records that are caused by the logical error and provides the identification to the database restore system 102.

The database restore system 102 determines 404 a restore time. The restore time may be determined according to a user input based on the time of the logical error. For example, a user identifies database entries that are affected by a logical error and determines the restore time as a time prior to the logical error. The user may identify a series of change records recording the data entry changes caused by the logical error and determines the restore time as the time point before the earliest change record caused by the logical error. The user provides the restore time to the database restore system 102. In the illustrated example, the 5:12 pm data entry change is caused by the logical error and the restore time 361 is set to a time right before the 5:12 pm data entry change thereby to restore the database to a state before the logical error. The user input may be received from the workstation 303.

The database restore system 102 identifies 405 data entries that changed after the restore time. For example, the database restore system 102 determines change records associated with time stamps after the restore time. The data entries are identified by data entry identifiers included in the change records. These entries are potentially affected by the logical error. Accordingly, these entries are reverted to their initial values before the logical error. In the illustrated example, the database restore system 102 determines that change records 354-355 are associated with timestamps after the restore time 361, and the corresponding data entries changed after the restore time.

The database restore system 102 determines 406 one or more data sources based on the restore time. The one or more data sources include the initial values of the entries that changed after the restore time. A data source can be a data entry change or a database version. The one or more data sources include the restore database version and any change to the database from the restore database version creation time to the restore time. Based on the restore time, the database restore system 102 identifies the database version that is the latest database version created before the restore time as the restore database version. The database restore system 102 identifies a set of change records associated with time stamps that are between the restore database version creation time and the restore time. For example, the database restore system 102 determines that the database version 315 and the 4:23 pm, 4:49 pm, 5:01 pm data entry changes are the data sources from where the initial values of the data entries can be found.

The database restore system 102 determines 407 the initial values of the data entries from the one or more data sources. For a data entry that changed after the restore time, the database restore system 102 determines a data source that includes the initial value and retrieves the initial value from the data source. For example, for a data entry that changed after the restore time, the database restore system 102 looks up its data entry ID in the one or more data sources. If there is a match, the database restore system 102 determines that the matching change record with the latest time stamp stores the initial value. If there is no match, the database restore system 102 concludes that the data entry is added after the restore time and does not exist before the restore time. In some embodiments, the database restore system 102 looks up an entry in the change records in a reverse chronological order. If there is a match, the database restore system 102 terminates checking the rest of the data sources. In some embodiments, to retrieve a data entry's value, the database restore system 102 creates a database index to represent the database and looks up a data entry ID in the database index. The database index is a data structure.

The database system 150 reverts 408 the data entries back to their initial values. The database system 150 receives the initial values from the database restore system 102 and updates the database with the initial values. For a data entry that is identified to have changed since the restore time, the database system 150 replaces its current value with the initial value. For example, if a data entry is removed after the restore time, the database system 150 restores the data entry with the initial value in the database. If a data entry is added after the restore time, the database system 150 removes the data entry in the database. If a data entry is modified, the database system 150 restores the data entry with the initial value in the database.

Figure 5:
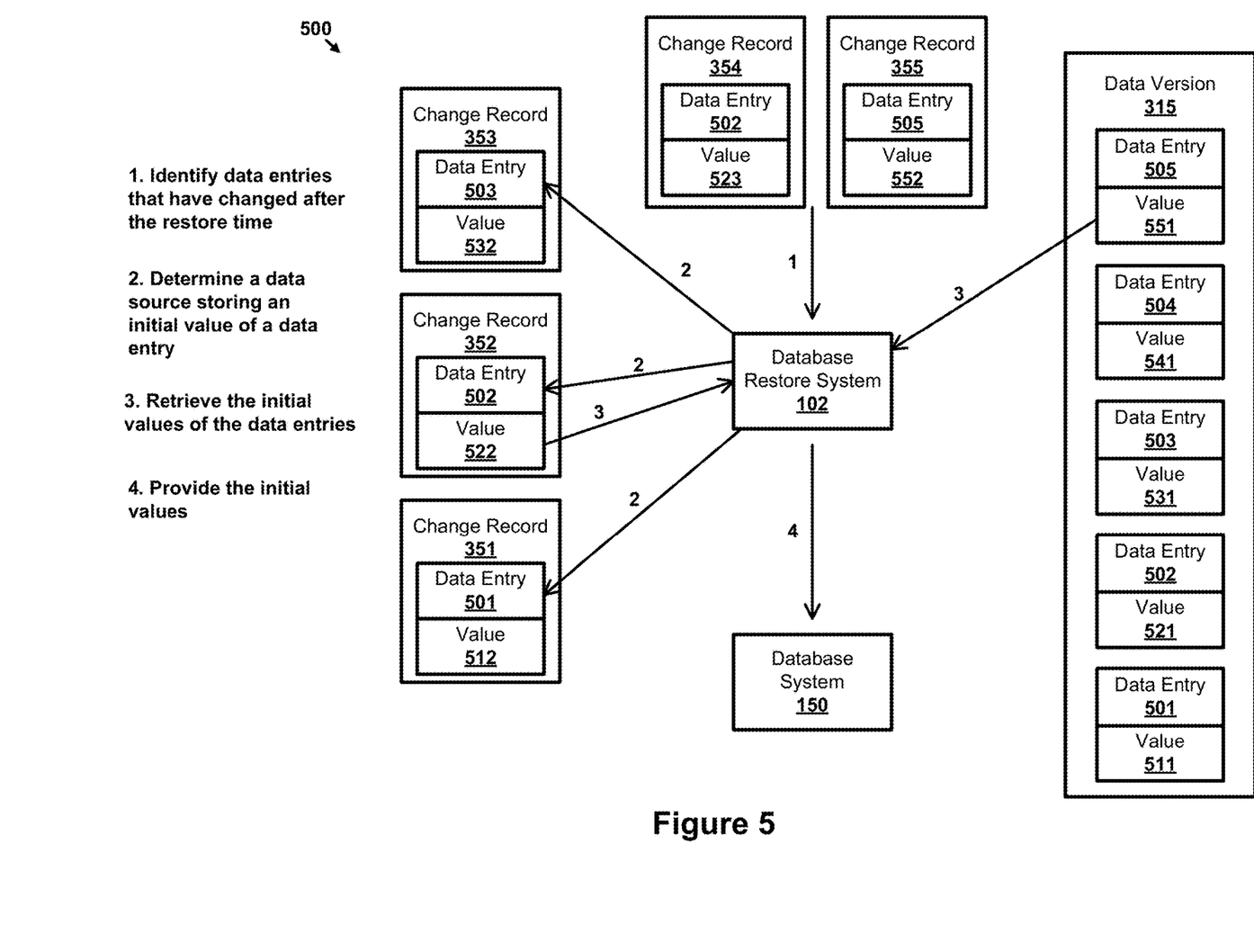
FIG. 5 illustrates an example of an environment determining data entries' initial values, according to one embodiment.

FIG. 5 illustrates an example 500 of the environment 100 determining data entries' initial values. At step 1, the database restore system 102 determines that data entries 502, 505 changed after the restore time 361.

At step 2, for each data entry, the database restore system 102 determines a data source that stores the data entry's initial value. The database restore system 102 looks up the data entry 602 (or 605) in a reverse chronological order: from the latest data source (i.e., the change record 355) to the earliest data source (i.e., the restore database version 315). Take the data entry 502 for example. The database restore system 102 compares the data entry 502 to the data entry 503 in the change record 355 and does not find a match. After that, the database restore system 102 compares the data entry 502 to the data entry 502 in the change record 352 and finds a match. Because there is a match, the database restore system 102 stops looking up the data entry 502 in the change record 351 or in the database version 315. The database restore system 102 determines that the value 522 stored in the change record 352 is the initial value of the data entry 502 before the restore time 351. Take the data entry 505 for example. The database restore system 102 looks up the data entry 505 in the change records 353, 352, and 351, and does not find a match. The database restore system 102 looks up the data entry 505 in the database version 315 and finds a match. The database restore system 102 determines that the value 551 stored in the database version 315 is the initial value of the data entry 505.

At step 3, for the data entry 502, the database restore system 102 retrieves the value 522 from the change record 352. For the data entry 505, the database restore system 102 retrieves the value 551 from the database version 315. The values 522 and 551 are used to restore the data entries 502 and 505, respectively.

In one example, the database restore system 102 creates an index indexing data entries in the database version 315 when creating the database version 315. The database restore system 102 can look up a data entry in the index rather than in the database version. The index of the database version 315 is incorporated into an overall index including indexes of previously created database versions 311-314. The database restore system 102 uses this index to search for the data entry 505. Additional discussion regarding this index search method for retrieving data entry values may be found in U.S. patent application Ser. No. 15/409,777, which is hereby incorporated by reference in its entirety. Other manners of obtaining value 651 may also be used.

At step 4, the database restore system 102 provides the initial values to the database system 150. The database system 150 restores the data entries 502, 505 to their initial values 532, 551, respectively.

Figure 6:
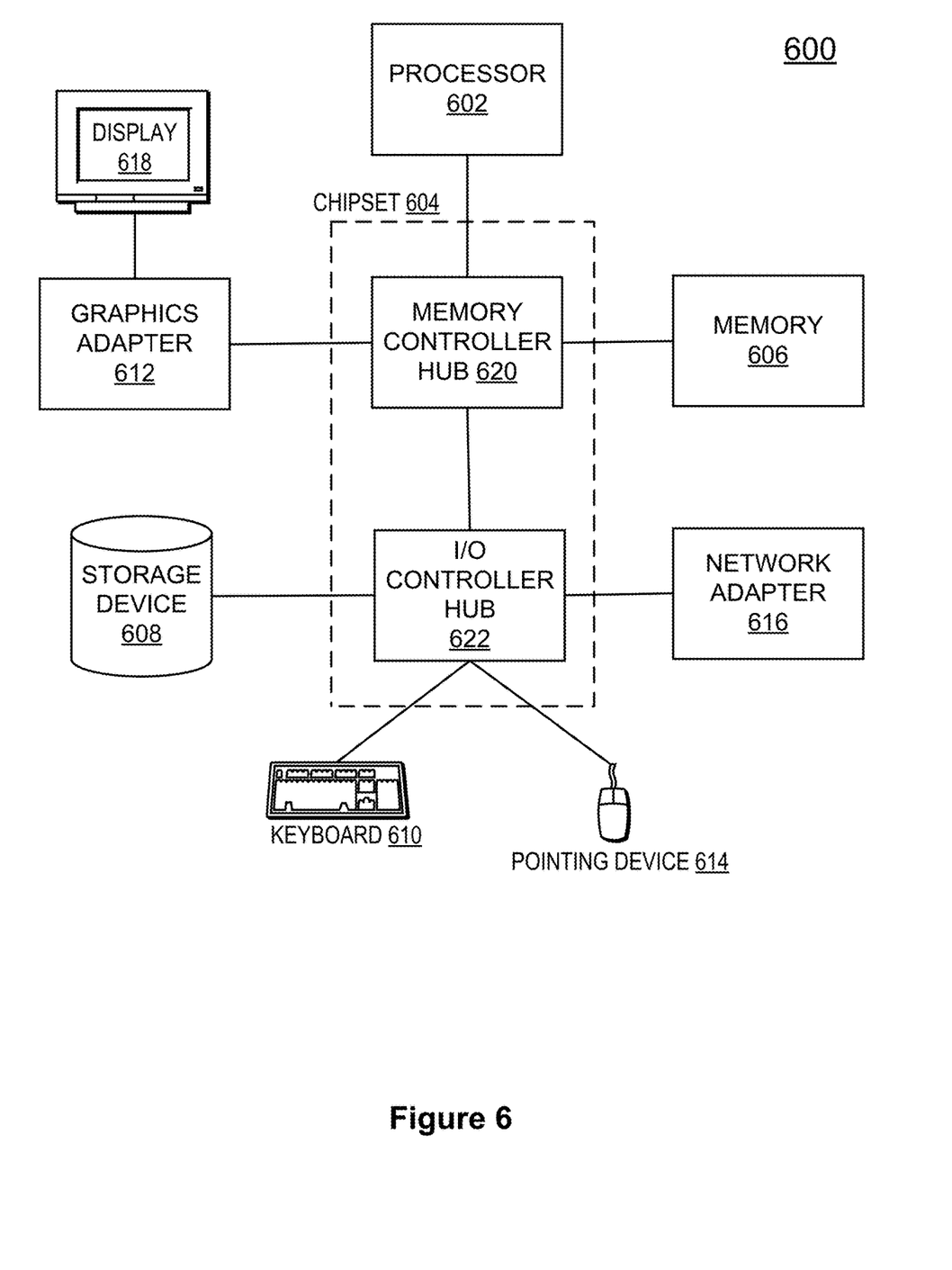
FIG. 6 is a high-level block diagram illustrating an example computing system.

Turning now to a discussion of the implementation of the database restore system 102, FIG. 6 is a high-level block diagram illustrating an example computing system 600 for implementing the entities shown in FIG. 1. The computing system 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of pointing device, a keyboard, or some combination thereof, and is used to input data into the computer 600. In some embodiments, the computer 600 may be configured to receive input (e.g., commands) from the input interface 614 via gestures from the user. The graphics adapter 612 displays images and other information on the display 618. The network adapter 616 couples the computer 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIG. 1 can vary depending upon the embodiment and the processing power required by the entity. For example, the database restore system 102 can run in a single computer 600 or multiple computers 600 communicating with each other through a network such as in a server farm. The computers 600 can lack some of the components described above, such as graphics adapters 612, and displays 618.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of restoring databases, comprising:
   determining a restore time to restore a database to a previous state from a later state, the previous state of the database corresponding to a restore time and including a first plurality of data entries associated with initial values, and the later state of the database including a second plurality of data entries associated with later values;
   identifying a creation time of a most recent version of a restore database, the restore time being subsequent to the creation time of the most recent version of the restore database;
   identifying partial changes made to the database, the partial changes including a first set of changes made to a first set of data entries of the database between the restore time to a later time corresponding to the later state;
   determining the initial values of the first set of data entries; and
   using the partial changes made to the database, restoring the database to the previous state by reverting the later values of the first set of data entries to the initial values.

2. The method of claim 1, wherein determining the initial values of the first set of data entries comprises:

determining one or more data sources storing the initial values; and for each data entry of the first set of data entries, retrieving an initial value from one of the one or more data sources, wherein the one or more data sources include a restore database version capturing a latest state of the database before the restore time and a second set of changes made to a second set of data entries of the database from a capture time of the restore database version to the restore time.

3. The method of claim 2, wherein determining the one or more data sources comprises selecting the restore database version from database versions based on the restore time, each database version capturing a state of the database at a corresponding time, the restore database version being a latest version before the restore time.

4. The method of claim 3, wherein determining one or more data sources comprises:

identifying the second set of changes made to a second set of data entries of the database from the capture time of the restore database version to the restore time.

5. The method of claim 2, wherein retrieving the initial value of a data entry from the one or more data sources comprises:

determining whether the second set of data entries includes the data entry; and responsive to determining that one of the second set of data entries matches the data entry, retrieving the initial value of the data entry from a matching data entry in the second set of data entries.

6. The method of claim 2, wherein retrieving the initial value of a data entry from the one or more data sources comprises:

determining whether the second set of data entries includes the data entry;

responsive to determining that a first data entry and a second data entry of the second set of data entries match the data entry, determining whether a first change corresponding to the first data entry is later than a second change corresponding to the second data entry; and responsive to determining that the first change is later than the second change, retrieving the initial value of the first data entry from the first data entry.

7. The method of claim 2, wherein retrieving the initial values of a data entry from the one or more data sources comprises:

determining whether the second set of data entries includes the data entry;

responsive to determining that the second set of data entries does not include the data entry, determining whether the restore database version includes the data entry; and responsive to determining that the restore database version includes the data entry, retrieving the initial value of the data entry from the restore database version.

8. The method of claim 2, wherein retrieving the initial value of a data entry from the one or more data sources comprises:

determining whether the second set of data entries includes the data entry;

responsive to determining that the second set of data entries does not include the data entry, determining whether the restore database version includes the data entry; and responsive to determining that the restore database version does not include the data entry, determining that the data entry did not exist at the restore time.

9. The method of claim 1, wherein identifying the first set of changes comprises:

identifying a first set of change records based on the restore time and the later time, each change record of the first set of change records associated with a timestamp between the restore time and the later time and describing a change made to a data entry at the timestamp.

10. The method of claim 1, wherein the first set of changes is stored in a first set of change records, each change record including a data entry identifier identifying a data entry being changed and a value of the data entry after being changed.

11. The method of claim 4, wherein identifying the second set of changes comprises:

identifying a second set of change records based on the restore time and the capture time of the restore database version, each change record of the second set of change records associated with a timestamp between the restore time and the capture time of the restore database version.

12. The method of claim 4, wherein the second set of changes is stored in a first set of change records, each change record including a data entry identifier identifying a data entry being changed and a value of the data entry after being changed.

13. The method of claim 2, further comprising:

periodically creating database versions, each database version capturing a state of the database at a corresponding time, the restore database version being a latest version before the restore time.

14. The method of claim 5, wherein determining whether the first set of data entries includes a data entry comprises:

querying a data entry identifier identifying the data entry in a first set of data entry identifiers identifying the first set of data entries; and responsive to identifying a match, determining that one of the second set of data entries matches the data entry.

15. The method of claim 7, wherein determining whether the first set of data entries includes the data entry comprises:

querying a data entry identifier identifying the data entry in a first set of data entry identifiers identifying the first set of data entries; and responsive to identifying no matches, determining that the second set of data entries does not include the data entry.

16. The method of claim 7, wherein retrieving the initial value of a data entry from the restore database version comprises:

querying a data entry identifier identifying the data entry in a database index representing data base entries included in the restore database version.

17. The method of claim 1, further comprising:

detecting a logical error in the database at the later time, wherein the restore time is determined based on the later time.

18. A system comprising:

a processor; and memory comprising instructions that are executable by the processor to perform:

determining a restore time to restore a database to a previous state from a later state, the previous state of the database corresponding to a restore time and including a first plurality of data entries associated with initial values, and the later state of the database including a second plurality of data entries associated with later values;

identifying a creation time of a most recent version of a restore database, the restore time being subsequent to the creation time of the most recent version of the restore database;

identifying partial changes made to the database, the partial changes including a first set of changes made to a first set of data entries of the database between the restore time to a later time corresponding to the later state;

determining the initial values of the first set of data entries; and using the partial changes made to the database, restoring the database to the previous state by reverting the later values of the first set of data entries to the initial values.

19. A non-transitory computer-readable storage medium storing instructions that are executable by a processor to perform:

determining a restore time to restore a database to a previous state from a later state, the previous state of the database corresponding to a restore time and including a first plurality of data entries associated with initial values, and the later state of the database including a second plurality of data entries associated with later values;

identifying a creation time of a most recent version of a restore database, the restore time being subsequent to the creation time of the most recent version of the restore database;

identifying partial changes made to the database, the partial changes including a first set of changes made to a first set of data entries of the database between the restore time to a later time corresponding to the later state;

determining the initial values of the first set of data entries; and using the partial changes made to the database, restoring the database to the previous state by reverting the later values of the first set of data entries to the initial values.

* * * * *